Oct. 2, 1934.  W. S. BAKER  1,975,345

PISTON

Filed Aug. 1, 1932

Inventor
William S. Baker

By Jack A. Ashley
Attorney

Patented Oct. 2, 1934

1,975,345

UNITED STATES PATENT OFFICE 1,975,345

PISTON

William S. Baker, Fort Worth, Tex., assignor to Double Seal Ring Company, Fort Worth, Tex., a corporation of Texas Application August 1, 1932, Serial No. 627,181

6 Claims. (Cl. 309—31)

This invention relates to new and useful improvements in pistons.

The invention has particularly to do with pistons and the rings thereof of the type which is used in internal combustion engines.

One object of the invention is to provide an improved piston so arranged as to trap gas or air under pressure between a pair of sealing rings, whereby air and gas are prevented from passing downwardly into the crank case and gas, oil and liquids are prevented from being drawn upward from the crank case into the combustion chamber.

A further object of the invention is to provide a piston structure wherein sealing rings are disposed in opposed relation above and below a sealing chamber or space, whereby air or gas under pressure may be admitted to the sealing space on the up stroke, thus permitting a pressure to be built up in said space which will cause the rings to seat so that no fluids can pass from above the rings to a point below the same, nor can any fluids below the rings pass to a point above the same.

Still another object of the invention is to provide a piston having an annular pressure chamber located between sealing rings for storing a quantity of fluid under pressure for acting upon said rings to seat the same.

A construction designed to carry out the invention will be hereinafter described together with other features of the invention.

Figure 1:
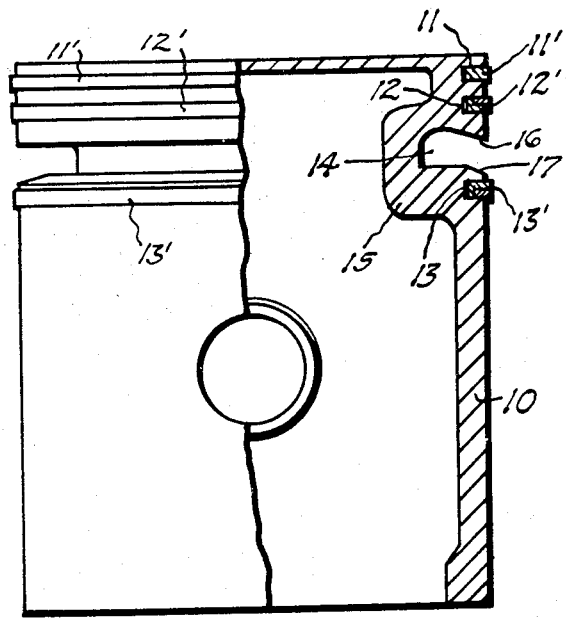
Figure 2:
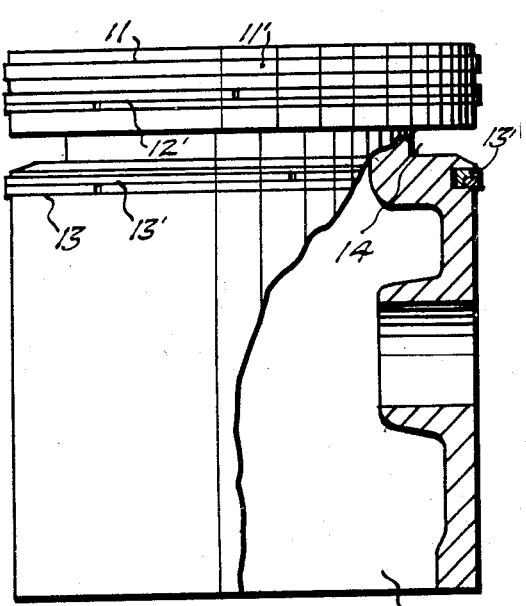
Figure 3:
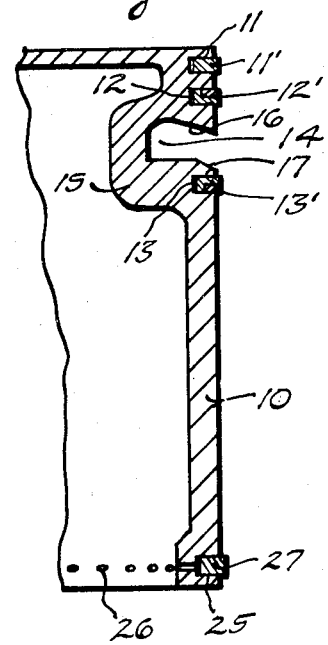

The invention will be more readily understood from a reading of the following specification and by reference to the accompanying drawing in which an example of the invention is shown, and wherein:

Figure 1 is a view partly in elevation and partly in section, showing a piston constructed in accordance with the invention, Figure 2 is a similar view at right angles to Figure 1, and Figure 3 is a vertical sectional view of one side of a piston illustrating still another form in which the invention may be carried out.

In the drawing the numeral 10 designates a piston such as is used in internal combustion engines, and which may be of any approved construction so long as the features of the invention are embodied therein. In Figures 1 and 2, I have shown the piston 10 provided with an annular top groove 11, an annular upper groove 12, and an annular lower groove 13. The top groove and the upper groove are spaced comparatively close together, but the upper and lower grooves are spaced apart sufficiently to permit the provision of an annular recess or radially deep space 14 therebetween. I have called the groove 12 an upper groove with respect to its relation to the recess 14 and have termed the groove 13 the lower groove because of its relation to said recess.

The recess 14 is formed in an internal boss 15 which projects into the piston and in this way the recess is given sufficient size and capacity to store an ample quantity of air or gas under pressure, to carry out the functions of the invention. It will be noted that the recess has an overhanging lip 16 at its upper outer portion and a lower bevelled edge 17. This particular structure is of course subject to variation, but the overhanging lip tends to deflect gas and air into the recess while the bevel aids in draining the recess of liquids.

In the top groove 11 I dispose an ordinary plain piston ring 11', while in the grooves 12 and 13 I use suitable sealing rings 12' and 13'. It is preferable to employ a double seal ring of the type comprising two annular members, one nested in the other, such as is shown in Patent No. 1,205,558. However, any sealing ring suitable for the purpose could be used. It will be noted that the rings 12' and 13' are disposed in opposite relation. The upper ring 12' is placed with its upper or sealing side so as to engage the upper side of the groove 12; while the lower ring 13' is disposed with its lower or sealing side in engagement with the lower side or bottom of the groove 13. By this arrangement a fluid pressure built up in the recess 14 will spread the upper and lower rings, thus forcing the ring 12' upwardly and the ring 13' downwardly, the upper ring sealing against the upper side of the groove 12 and the lower ring sealing against the lower side of the groove 13. In this position a barrier is formed so that fluids from above and fluids from below can not pass.

It will be obvious that when the piston 10 is moved upwardly on its compression stroke, gas or air under pressure above the piston may pass downwardly around the rings 11' and 12', but such gas pressure could not pass the ring 13' because the same is held to its bottom seat by the up-stroke of the piston, as well as by the pressure of the gas itself. By this arrangement, a gas pressure will be built up in the recess 14. Whenever pressure is relieved above or below the upper or lower rings, the gas pressure in the recess 14 between said rings will remain trapped. Such pressure will also get in behind the rings and hold them outwardly against the cylinder wall.

Upon the down stroke of the piston, the ring 12' will, of course, be held in its sealing position against the top of the groove 12. The downward movement of the piston would tend to unseat the ring 13', but the trapped gas pressure in the recess 14 is sufficient to hold the ring 13' to its seat and thus the ring 13' is at all times held to its seat, regardless of the stroke of the piston. This constant seating of the ring 13' prevents gas, oil and other liquids from passing the barrier formed by the seal. It is to be understood that the film of oil which is necessary to the side walls of the cylinder is not disturbed, but on the other hand an excessive passage of oil is prevented.

In Figure 3 I have shown a form similar to Figure 1, with the addition of a groove 25 located at the bottom of the piston. This groove has perforations 26 extending through the wall of the piston and a scraper ring 27 is mounted in the groove. This ring acts to keep the cylinder wall clear of excess oil and the perforations 26 permit the oil above said ring to drain through the piston into the crank case.

The description which has been given recites more or less detail of a particular embodiment of the invention which is set forth as new and useful, however, I desire it understood that the invention is not limited to such exact details of construction, because it is manifest that changes and modifications may be made within the scope of the appended claims without departing from the spirit of the invention.

What I claim and desire to secure by Letters Patent, is:

1. A piston comprising spaced upper and lower ring grooves, and rings having sealed ends mounted in said grooves, one of said rings having its sealing side disposed to contact the upper side of the upper groove and the other sealing ring having its sealing side disposed to contact the lower side of the lower groove, the piston having a chamber formed therein between said grooves for trapping gas under pressure, whereby said rings are seated and gas is substantially prevented from passing downwardly below the lower ring and liquids are substantially prevented from passing upwardly beyond the upper ring.

2. A piston comprising spaced upper and lower ring grooves, and rings having sealed ends mounted in opposed sealing relation to each other in said grooves, the piston having a gas trapping space formed therein between said ring grooves, whereby gas is substantially prevented from passing downwardly into the crank case and also whereby liquids are substantially prevented from being drawn upwardly into the combustion chamber above the piston.

3. A piston having a plurality of ring grooves, and a pair of rings having sealed ends mounted in two of said grooves, one of said rings having its sealing side disposed to engage the upper side of the upper groove and the other ring being inserted with its sealing side in contact with the bottom of the lower groove, there being a pressure chamber formed in said piston between the ring grooves for trapping gas under pressure between the rings.

4. A piston comprising spaced top, upper and lower ring grooves, a plain ring mounted in the top groove, and rings having sealed ends mounted in the upper and lower ring grooves, one of said rings having its sealing side disposed to contact the upper side of the upper groove and the other sealing ring having its sealing side disposed to contact the lower side of the lower groove, the piston having a gas trapping space formed therein between said ring grooves, whereby gas is substantially prevented from passing downwardly into the crank case and also whereby liquids are substantially prevented from being drawn upwardly into the combustion chamber above the piston.

5. A piston comprising, spaced upper and lower ring grooves, and rings having sealed ends mounted in said grooves, one of said rings having its sealing side disposed to contact the upper side of the upper groove and the other sealing ring having its sealing side disposed to contact the lower side of the lower groove, the piston having a pressure chamber formed therein between said ring grooves to hold the upper of said rings against the upper side of said upper groove and also to hold the lower of said rings against the lower side of said lower groove, whereby gas is substantially prevented from passing downwardly into the crank case and also whereby liquids are substantially prevented from being drawn upwardly into the combustion chamber above the piston.

6. A piston comprising, spaced upper and lower ring grooves, and rings having sealed ends mounted in said grooves, one of said rings having its sealing side disposed to contact the upper side of the upper groove and the other sealing ring having its sealing side disposed to contact the lower side of the lower groove, the piston having a pressure chamber formed therein between said ring grooves to hold the upper of said rings against the upper side of said upper groove and also to hold the lower of said rings against the lower side of said lower groove, whereby gas is substantially prevented from passing downwardly into the crank case and also whereby liquids are substantially prevented from being drawn upwardly into the combustion chamber above the piston, said piston also having a ring groove at its bottom provided with oil perforations, and a scraper ring mounted in said bottom groove.

WILLIAM S. BAKER.